US011409455B2

(12) United States Patent
Chen et al.

(10) Patent No.: US 11,409,455 B2
(45) Date of Patent: Aug. 9, 2022

(54) METHOD AND SYSTEM FOR ENABLING DEDUPLICATION FOR ASYNCHRONOUS REPLICATION IN A STORAGE SYSTEM

(71) Applicant: EMC IP Holding Company LLC, Hopkinton, MA (US)

(72) Inventors: Xiangping Chen, Sherborn, MA (US); Ronen Gazit, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/073,705

(22) Filed: Oct. 19, 2020

(65) Prior Publication Data
US 2022/0121380 A1    Apr. 21, 2022

(51) Int. Cl.
*G06F 3/06* (2006.01)

(52) U.S. Cl.
CPC ............ *G06F 3/0641* (2013.01); *G06F 3/065* (2013.01); *G06F 3/067* (2013.01); *G06F 3/0614* (2013.01); *G06F 3/0653* (2013.01); *G06F 3/0664* (2013.01)

(58) Field of Classification Search
CPC ...... G05B 13/00–048; G05B 15/00–02; G05B 17/00–02; G06F 1/00–3296; G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 17/00–40; G06F 21/00–88; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G06K 9/00–6298; G06N 3/00–126; G06N 5/00–048; G06N 7/00–08; G06N 10/00; G06N 20/00–20; G06N 99/00–007; G06T 1/00–60;
(Continued)

(56) References Cited

U.S. PATENT DOCUMENTS 8,099,571 B1 *   1/2012   Driscoll ................ G06F 3/0613
                                                                711/162
8,458,144 B2 *   6/2013   Maydew ............. G06F 16/1748
                                                                707/692

(Continued)

OTHER PUBLICATIONS

B. Nicolae, "Techniques to improve the scalability of collective checkpointing at large scale," 2015 International Conference on High Performance Computing & Simulation (HPCS), 2015, pp. 660-661, doi: 10.1109/HPCSim.2015.7237113. (Year: 2015).*

(Continued)

*Primary Examiner* — Daniel C. Chappell
(74) *Attorney, Agent, or Firm* — Krishnendu Gupta; Deepika Bhayana; Lesley A. Leonessa

(57) ABSTRACT

Techniques are used for enabling deduplication for asynchronous replication in a storage system. The techniques may be used to provide, among other things, retrieving, on a source system, a virtual index key corresponding to a logical address, and determining whether a deduplication index table for a target system includes an entry with the same virtual index key.

20 Claims, 8 Drawing Sheets

(58) Field of Classification Search
CPC ........ G06V 30/00–43; G11B 20/00–24; G11B 33/00–1493; G11C 11/00–5692; G11C 13/00–06; G11C 14/00–009; G11C 15/00–06; G11C 16/00–3495; G11C 17/00–18; G11C 2207/00–229; G11C 2216/00–30; H01L 25/00–50; H01L 27/00–3293; H01L 2225/00–1094; H03M 7/00–707; H04L 9/00–38; H04L 12/00–66; H04L 41/00–5096; H04L 49/00–9094; H04L 61/00–6095; H04L 67/00–42
See application file for complete search history.

(56) References Cited

U.S. PATENT DOCUMENTS

| | | | | |
|---|---|---|---|---|
| 9,075,532 B1 * | 7/2015 | Bromley | ............... | G06F 3/0608 |
| 9,152,628 B1 * | 10/2015 | Stacey | ............... | G06F 16/1744 |
| 9,959,061 B1 * | 5/2018 | Natanzon | ............... | G06F 3/065 |
| 10,282,124 B2 * | 5/2019 | Rueger | ............... | G06F 3/0652 |

OTHER PUBLICATIONS

Implementing IBM Storage Data Deduplication Solutions; Osuna, Alex et al.; Mar. 2011; retrieved from https://www.redbooks.ibm.com/redbooks/pdfs/sg247888.pdf on May 16, 2022 (Year: 2011).*

R. Akbar, M. S. Husain and M. Suaib, "Comparative study of various backup and monitoring techniques," 2015 International Conference on Green Computing and Internet of Things (ICGCIoT), 2015, pp. 1530-1537, doi: 10.1109/ICGCIoT.2015.7380710. (Year: 2015).*

Y. Allu, F. Douglis, M. Kamat, P. Shilane, H. Patterson and B. Zhu, "Backup to the Future: How Workload and Hardware Changes Continually Redefine Data Domain File Systems," in Computer, vol. 50, No. 7, pp. 64-72, 2017, doi: 10.1109/MC.2017.187. (Year: 2017).*

* cited by examiner

METHOD AND SYSTEM FOR ENABLING DEDUPLICATION FOR ASYNCHRONOUS REPLICATION IN A STORAGE SYSTEM

BACKGROUND

Technical Field

This application relates to enabling deduplication for asynchronous replication in a storage system.

Description of Related Art

A distributed storage system may include a plurality of storage devices to provide data storage to a plurality of hosts. The plurality of storage devices and the plurality of hosts may be situated in the same physical location, or in one or more physically remote locations. The storage devices and the hosts may be connected to one another over one or more computer networks.

Data replication can generally comprise copying, or replicating, data from one set of storage devices to another set of storage devices for the purpose of backup. For example, data can be replicated from storage devices within a first computing cluster (which can be a set of computing devices that work together and can be logically considered to be a single computing system) to storage devices within a second computing cluster. Then, if the first computing cluster fails, the second computing cluster can possess an updated state of the first computing cluster and can take over services provided by the first computing cluster, such as data storage and access.

Data deduplication (also referred to simply as "deduplication") is a space-saving technology intended to eliminate redundant (duplicate) data (such as, files) on a data storage system. By saving only one instance of a file, disk space can be significantly reduced. For example, suppose a file of size 10 megabytes (MB) is stored in ten folders of each employee in an organization that has ten employees. As a result, 100 megabytes (MB) of the disk space is consumed to maintain the same file of size 10 megabytes (MB). Deduplication ensures that only one complete copy is saved to a disk. Subsequent copies of the file are only saved as references that point to the saved copy, such that end-users still see their own files in their respective folders. Similarly, a storage system may retain 200 e-mails, each with an attachment of size 1 megabyte (MB). With deduplication, the disk space needed to store each attachment of size 1 megabyte (MB) is reduced to just 1 megabyte (MB) from 200 megabyte (MB) because deduplication only stores one copy of the attachment.

It is noted that the terms "storage device(s)", "drive(s)", and "disk(s)" are employed herein interchangeably, even though it is well known that not all physical storage devices or drives include rotating disks.

SUMMARY OF THE INVENTION

One aspect of the current technique is a method for enabling deduplication for asynchronous replication in a storage system. The method includes retrieving, on a source system, a virtual index key corresponding to a logical address. The method also includes determining whether a deduplication index table for a target system includes an entry with the same virtual index key.

In some embodiments, the method includes determining that the deduplication index table does not include the virtual index key. The method then includes augmenting the deduplication index table to include the virtual index key and the next logical address on the target system to be processed in the asynchronous replication. The method may further include sending, to the target system, data to store in association with the next logical address to be processed in the asynchronous replication.

In further embodiments, the method includes determining that the deduplication index table includes the virtual index key. Then, the method includes retrieving the logical address in the deduplication index table corresponding to the virtual index key, as well as instructing the target system to perform a metadata copy from the retrieved logical address to the next logical address on the target system to be processed in the asynchronous replication.

In many embodiments, the method includes retrieving a virtual address associated with an entry in a virtual index. The method may include accessing a pointer stored at the logical address and retrieving a virtual address referenced by the pointer.

Another aspect of the current technique is a system, with a processor, for enabling deduplication for asynchronous replication in a storage system. The processor is configured to retrieve, on a source system, a virtual index key corresponding to a logical address, and determine whether a deduplication index table for a target system includes an entry with the same virtual index key. The processor may be configured to perform any other processes in conformance with the aspect of the current techniques described above.

BRIEF DESCRIPTION OF THE DRAWINGS

Features and advantages of the present technique will become more apparent from the following detailed description of exemplary embodiments thereof taken in conjunction with the accompanying drawings in which.

DETAILED DESCRIPTION OF EMBODIMENT(S)

Figure 1:
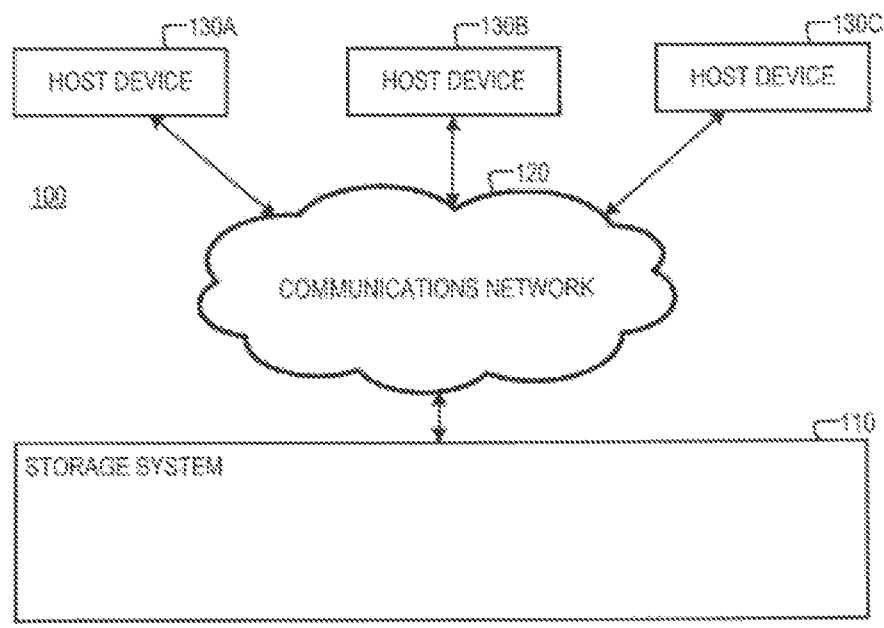
FIG. 1 is a diagram of an example of a computing system, including a storage system, according to aspects of the disclosure.

Described below is a technique for enabling deduplication for asynchronous replication in a storage system, which technique may be used to provide, among other things, retrieving, on a source system, a virtual index key corresponding to a logical address, and determining whether a deduplication index table for a target system includes an entry with the same virtual index key.

During a replication cycle, a source system determines the difference between the two most recently captured snapshots of a volume. These differences are sent to the target system and stored as a shadow snapshot. Transferring the data can consume a significant amount of bandwidth and stall other operations of the storage system.

Data deduplication is a process by which a data storage system can detect multiple identical copies of data and keep a single copy of that data, thus eliminating the redundant data by removing other copies of that data and thus improving storage utilization. In at least some systems, data deduplication requires iterating over data in one or more storage extents. Conventional approaches to deduplication rely on rigorous cryptographic hash signatures (also referred to herein as "strong hash signatures"), which are obtained by applying a cryptographic hash function to data to product its digest. Because identical copies of data result in the same digest, conventional deduplication techniques store digests in an index table and compare the strong hash signatures of data to be deduplicated to these digests. If the techniques find a match, an exact copy of data is assured and the data is deduplicated. In this manner, identical portions of data are mapped to a single copy of the data.

However, such conventional techniques consume significant amounts of computing resources, especially memory and/or storage for the index tables storing strong hash signatures. More advanced deduplication techniques have been developed which do not rely on strong hash signatures. Instead, these techniques rely on similarity hash signatures, which indicate, but do not guarantee, that data may match and be appropriate for deduplication. In this technological context, there is no need to store hash signatures, whether strong or similar, in an index table with their corresponding data. Thus, such deduplication techniques forgo the memory and/or storage that would normally be consumed by index tables storing digests and their associated data.

However, advanced deduplication techniques pose unique challenges for asynchronous replication. Effective replication requires storage of an exact copy of a volume, but similarity hash signatures do not convey any assurances that identical copies of data have been previously encountered and/or transferred to the target system. Comparing data against a log of the history of data transferred from the source system to the target system might be more effective in determining which data need not be transferred, but the cost of keeping a log and performing such comparisons would be impractical, if not prohibitive.

The current solution uses a virtual index to identify unique data on the source system, and a deduplication index table to identify data that has previously been transferred to a target system. Each entry in the virtual index, which is identified by a key, points to data by storing its physical address on disk. When a source system deduplicates data, the source system replaces the data at a logical address with a pointer to the corresponding entry in the virtual index.

For asynchronous replication, the source system determines the difference between the two most recently captured snapshots of a volume. The source system identifies the virtual index keys corresponding to the data within the differences. If data has previously been transferred to the target system, its virtual index key will already appear in a deduplication index table associated with the target system. In these situations, the source system sends the target system an instruction to perform a metadata copy from the existing copy of data on the target system to the next logical address being used in the asynchronous replication. If data has not previously been transferred to the target system, its virtual index key will not appear in the deduplication index table. The source system requests the logical address on the target system that will store the data, augments the deduplication index table with the virtual index key for the data and the logical address retrieved from the target system, and transfers the data to be stored on the target system. Because the source system transfers only the data that has not previously been sent to the target system, the techniques described herein substantially reduce the bandwidth required by asynchronous replication.

In at least some implementations in accordance with the techniques as described herein, enabling deduplication for asynchronous replication in storage systems can provide one or more of the following advantages: reductions in bandwidth required by asynchronous replication (possibly by an order of magnitude), lower recovery point objectives (RPO) for asynchronous replication, and lower costs in deploying target systems.

FIG. 1 is a diagram of an example of a system 100, according to aspects of the disclosure. The system 100 may include a storage system 110 that is coupled to one or more host devices 130 via a communications network 120. The storage system 110 may be configured to retrieve and store data on one or more storage devices in response to I/O requests that are transmitted by the host devices 130. The communications network 120 may include a local area network (LAN), a wide area network (WAN), the Internet, and/or any or suitable type of communications network. Each of the host devices 130 may include a desktop computer, a laptop computer, a server, and/or any other suitable type of electronic device. Additionally or alternatively, each of the host devices 130 may include a file server, which is configured to provide an interface between the storage system 110 and client devices (or applications) that read and write data to the storage system 110.

Figure 2:
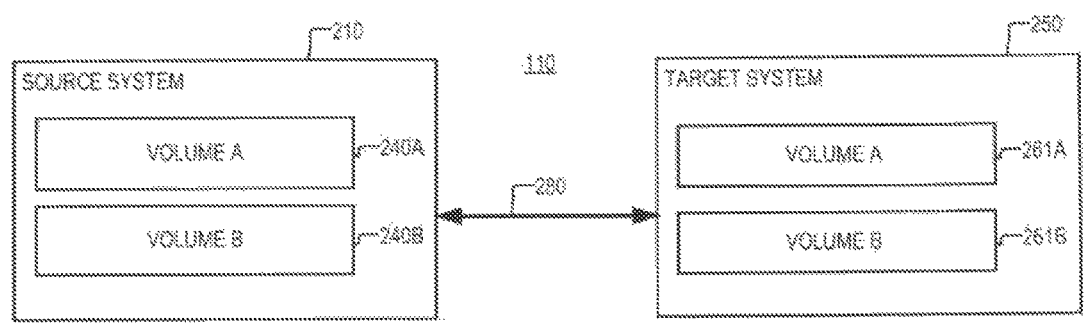
FIG. 2 is a diagram illustrating an exemplary operation of the storage system of FIG. 1, according to aspects of the disclosure.

FIG. 2 is a diagram illustrating an exemplary operation of the storage system 110 of FIG. 1. As illustrated, the storage system 110 may include a source system 210 that is coupled to a target system 250 via a network 280. The network 280 may include a TCP/IP network, an InfiniBand network, and/or any other suitable type of communications network. The source system 210 may store a volume 240A and a volume 240B. The target system 250 may store a volume 261A and a volume 261B. Volume 261A may be a replica of the volume 240A and volume 261B may be a replica of the volume 240B. According to the present example, volumes 261A and 261B are maintained via asynchronous replication. It will be understood that the present disclosure is not limited to any specific method for performing asynchronous replication.

Furthermore, although FIG. 2 depicts two volumes 240A, 240B, one of ordinary skill in the art would appreciate that the source system 210 may store any number of volumes, and the target system 250 may store the corresponding number of replicas. Additionally, while the storage system 110 of FIG. 2 depicts a single target system 250, various embodiments may deploy multiple target systems 250.

In illustrative embodiments, the storage system 110 may employ a snapshot (or replication) mechanism to replicate data between the source system 210 and the target system 250. A replica (or snapshot) may be created from data within the source system 210 and transferred to one or more target system 250 during a data replication cycle by data replication. Data replication may be performed based on data replication policies that may define various settings for data recovery operations. For example, a policy may define a plurality of attributes, such as a frequency with which replicas are generated and how long each replica is kept at the target system 250. A policy may also define a remote replica lag (e.g., the length of time during which updates may be lost in case of a source system 210 failure), a recovery point objective (RPO) (e.g., a maximum acceptable lag time between the time data is committed to the source system 210 and the time the data is committed to the target system 250 or an acceptable amount of data loss measured in time), a recovery time objective (RTO) (e.g., the time taken to perform the recovery), the mode of replication (e.g., synchronous, asynchronous, continuous data protection (CDP), point in time (PIT), and so forth), and/or other attributes.

Figure 3:
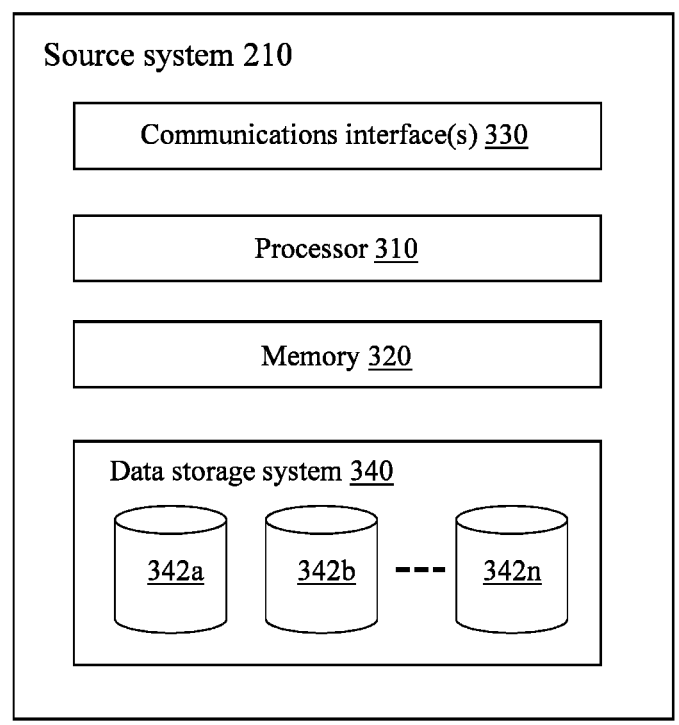
FIG. 3 is a block diagram illustrating the source system in the storage system of FIG. 2, according to aspects of the disclosure.

FIG. 3 is a block diagram illustrating the source system 210 of FIG. 2, though similar teachings may be applied to the target system 250 as well. The source system 210 may include a processor 310, a memory 320, a communications interface(s) 330, and a data storage system 340. The processor 310 may include any of one or more general-purpose processors (e.g., x86 processors, RISC processors, ARM-based processors, etc.), one or more Field Programmable Gate Arrays (FPGAs), one or more application-specific circuits (ASICs), and/or any other suitable type of processing circuitry. The memory 320 may include any suitable type of volatile and/or non-volatile memory. In some implementations, the memory 320 may include one or more of a random-access memory (RAM), a dynamic random memory (DRAM), a flash memory, or any other suitable type of memory device. The communications interface(s) 330 may include any suitable type of communications interface, such as one or more Ethernet adapters, one or more Wi-Fi adapters (e.g., 802.1414 adapters), and one or more Long-Term Evolution (LTE) adapters, for example.

The data storage system 340 may include one or more data storage devices 342a-342n. Unless noted otherwise, data storage devices 342a-342n may be used interchangeably herein to refer to hard disk drive, solid state drives, and/or other known storage devices. One or more data storage devices 342a-342n may be manufactured by one or more different vendors. Each of the storage devices 342a-342n included in the data storage system 340 may be inter-connected (not shown). Additionally, the data storage system 340 may also be connected to the hosts 130A-130n through any one or more communication connections that may vary with each particular embodiment.

It should be noted that the particular data storage system 340 and examples as described herein for purposes of illustration should not be construed as a limitation. Other types of commercially available data storage systems 340, as well as processors and hardware controlling access to these particular devices, may also be included in an embodiment.

In some embodiments, the data storage system 340 provides block-based storage by storing the data in blocks of logical storage units (LUNs) or volumes and addressing the blocks using logical block addresses (LBAs). In other arrangements, the data storage system 340 provides file-based storage by storing data as files of a file system and locating file data using inode structures. In yet other arrangements, the data storage system 340 stores LUNs and file systems, stores file systems within LUNs, and so on.

Figure 4:
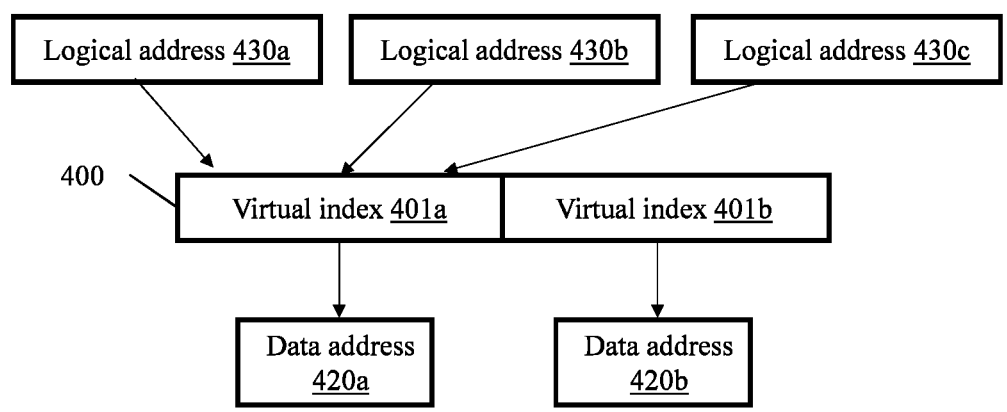
FIG. 4 is a schematic diagram illustrating the virtual index created and used according to advanced deduplication techniques applied to the storage system of FIG. 1.

FIG. 4 is a schematic diagram illustrating the virtual index 400 created and used according to advanced deduplication techniques applied to the storage system 110 of FIG. 1. The virtual index 400 is used to identify unique data in the source system 210. Each entry 401a, 401b (collectively, "401") in the virtual index 400 is identified by a key, such as the virtual address of the entry 401. An entry 401 is associated with data by storing a pointer to its physical address 420a on disk.

When the source system 210 deduplicates new data, the source system 210 replaces the data at a logical address 430a with a pointer to the corresponding entry 401 in the virtual index 400. Consequently, multiple logical addresses 430a, 430b, 430c may point to the same entry 401a in the virtual index 400, which in turn points to a single copy of data at a particular physical address 420a. Because the similarity hash signatures used by advanced deduplication techniques do not guarantee that two copies of data are identical, more than one entry in the virtual index may point to the same data on disk (or the same data at different physical addresses). However, the potential repetition within the virtual index is offset by the reduction in computing resources consumed by the advanced deduplication techniques.

Figure 5:
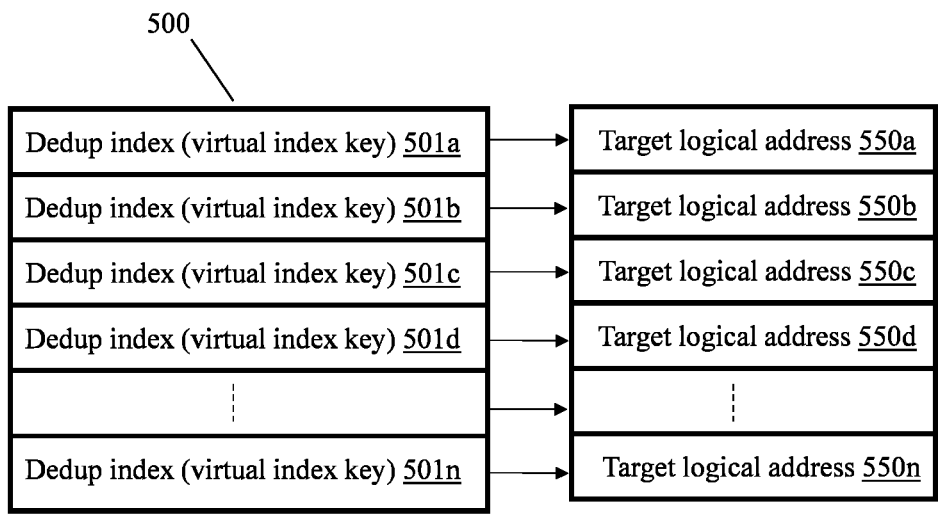
FIG. 5 is a schematic diagram illustrating a deduplication index table used, in conjunction with the virtual index, to track data that has been transferred to a target system of the storage system of FIG. 1.

FIG. 5 is a schematic diagram illustrating a deduplication index table 500 used, in conjunction with the virtual index 400, to track data that has been transferred to a target system 250 of the storage system 100 of FIG. 1. Each entry 501a, 501b, . . . , 501n (collectively, "501") in the deduplication index table 500 stores a key from the virtual index 400 corresponding to data that has previously been transferred to the target system 250. Each key is associated with the logical address 550a, 550b, . . . , 550n (collectively, "550") on the target system 250 where the data has been stored.

For asynchronous replication, the source system 210 determines the difference between the two most recently captured snapshots of a volume 240a and deduplicates this difference. To determine which data should be transferred to the target system 250, the source system 210 uses a logical address 430 in the difference between snapshots to identify a key in the virtual index 400. The source system 210 searches the deduplication index table 500 for an entry 501 with this key.

If the key is found in the deduplication index table 500, the data stored on the source system 210 has previously been transferred to the target system 250. The source system 210 retrieves from the deduplication index table 500 the logical address 550 on the target system 520 that corresponds to the key. The source system 210 instructs the target system 250 to perform a metadata copy from the logical address 550 retrieved from the deduplication index table 500 to the next logical address on the target system 250 to be processed in the asynchronous replication. As a result, the source system 210 does not transfer the data itself, thereby reducing the bandwidth required by the replication cycle.

Figure 6:
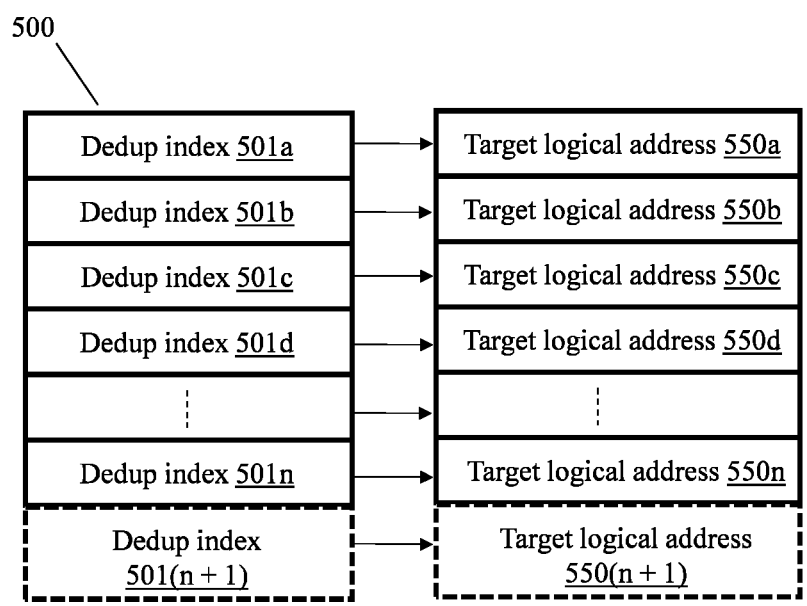
FIG. 6 is a schematic diagram illustrating the deduplication index table of FIG. 1, when augmented to account for data that is being newly transferred to the target system.

If the key is not found in the deduplication index table 500, then the data stored on the source system 210 needs to be transferred to the target system 250. The source system 210 sends the data to the target system 250 to be stored, and also requests the next logical address on the target system 250 that is being processed in the asynchronous replication. The source system 210 augments the deduplication index table 500. A new entry is created that includes the key from the virtual index 400 and the logical address returned from the target system 250, as shown in FIG. 6. Thus, the next time during an asynchronous replication cycle that the source system 210 encounters this particular key from the virtual index 400, the source system 210 can send the target system 250 an instruction to perform a metadata copy, instead of sending the data itself.

Figure 7A:
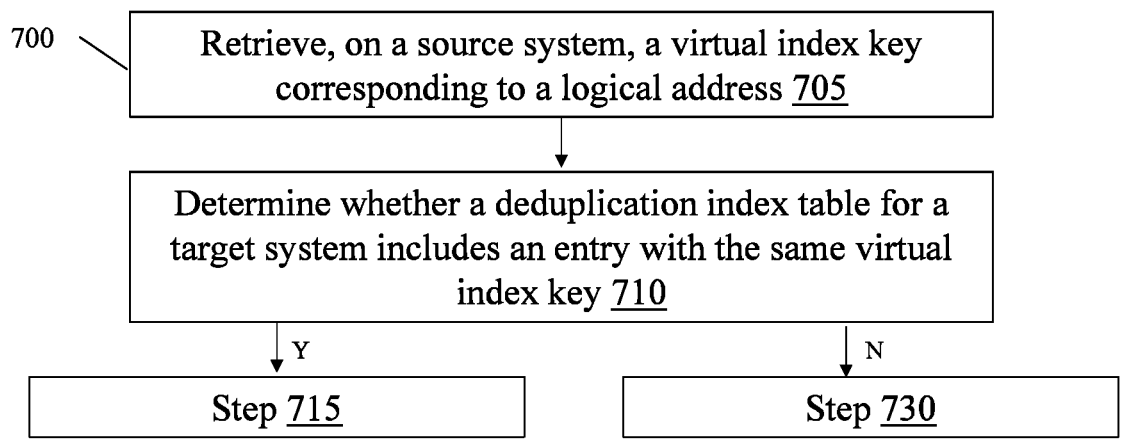
FIGS. 7A-7B is an exemplary flow diagram of a method for enabling deduplication for asynchronous replication in a storage system.
Figure 7B:
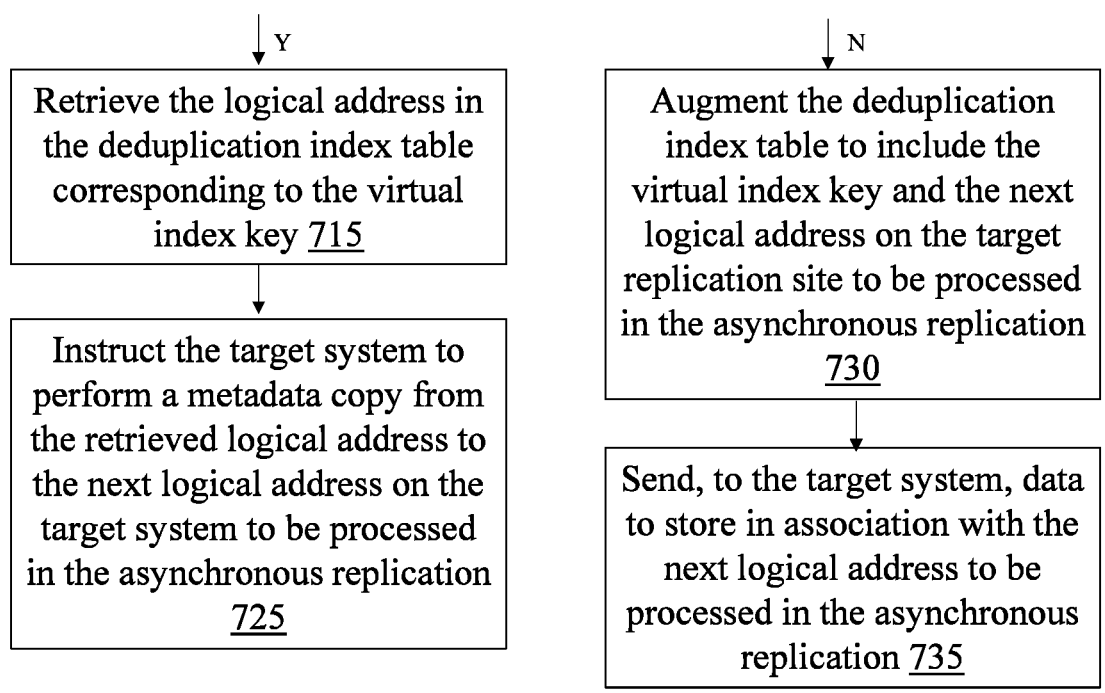

FIGS. 7A-7B is an exemplary flow diagram of a method 700 for enabling deduplication for asynchronous replication in a storage system. The method 700 retrieves, from a source system 210, an entry 401 in a virtual index 400 corresponding to a logical address (step 705). The method 700 determines whether a deduplication index table 500 for a target system 250 includes an entry 501 with the same virtual index key (step 710). If so, the method 700 retrieves the logical address 550 in the deduplication index table 500 corresponding to the virtual index key (step 715). This logical address 550 indicates where previously deduplicated data has been stored on the target system 250. The method 700 then instructs the target system to perform a metadata copy from the retrieved logical address to the next logical address on the target system to be processed in the asynchronous replication (step 725).

However, if the deduplication index table 500 for the target system 250 does not include an entry 501 with the same virtual index key, the data has not previously been transferred. The method 700 augments the deduplication index table 500 to include the virtual index key and the next logical address on the target replication site to be processed in the asynchronous replication (step 730). The method 700 sends, to the target system, data to store in association with the next logical address to be processed in the asynchronous replication (step 735).

As noted above, while the storage system 110 of FIG. 2 depicts a single target system 250, various embodiments may deploy multiple target systems 250. In some embodiments, each target system 250 has a different replication cycle. As a result, the state of a volume 240 during one target system's 250a replication cycle may vary from its state during another system's 250b replication cycle, such that different data would need to be transferred to the respective target systems 250 (e.g., snapshots are captured at different points in time, so the differences between snapshots applied to target systems 250 may vary). Consequently, the source system 210 may store multiple deduplication index tables 500, one for each target system 250.

However, in some situations, multiple target systems 250 may have similar enough recovery point objectives that the state of the volume 240 during replication is the same, or comparable. In these situations, the source system 210 may identify the deduplication index table 500 to apply to this set of target systems 250, and asynchronously replicate the volume 240 to each of the target systems 250 in the set using the identified deduplication index table 500.

Additionally, when target systems 250 pertain to a unified remote system, the source system 210 may determine that the same deduplication index table 500 may be applied to all of them. In some embodiments, the target systems 250 may reside on the same remote appliance, so as to have the same tenant identification. A source system 210 may verify that target systems 250 have the same tenant identification before selecting a deduplication index table 500 to use in asynchronous replication to the target systems 250.

In some embodiments, each entry 401 in the virtual index 400 includes a generation count that indicates whether the virtual address therein is still valid. The source system 210 may execute a defragmentation process to recover partially unused virtual storage, transferring entries on one virtual page (VLB) to another. When a VLB is subject to defragmentation, all entries 401 of the virtual index 400 on that VLB have their generation counts incremented. Based on its generation count, a virtual address may be ignored as invalid.

In some embodiments, storage on the target system 250 may be overwritten. Given this possibility, the source system 210 may ensure that the deduplication index table 500 is still valid before sending instructions to the target system 250 to perform a metadata copy. For example, after finding a virtual index key 401 in the deduplication index table 500, the source system 210 may request that the target system 250 return the data at the corresponding logical address 550. The source system 210 may determine whether the returned data exactly matches the data being deduplicated, and It should again be emphasized that the implementations described above are provided by way of illustration, and should not be construed as limiting the present invention to any specific embodiment or group of embodiments. For example, the invention can be implemented in other types of systems, using different arrangements of processing devices and processing operations. Also, message formats and communication protocols utilized may be varied in alternative embodiments. Moreover, various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

Furthermore, as will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for reducing bandwidth consumed during asynchronous replication of deduplicated data in a storage system, the method comprising:
   identifying unique data on a source storage system of the storage system during a deduplication process using a virtual index stored on the source storage system, wherein the virtual index stored on the source storage system comprises a virtual index key;
   retrieving, on the source storage system, a first virtual index key corresponding to a pointer stored at a logical address on the source storage system;
   determining whether data associated with the logical address on the source storage system has been transferred to a target storage system by searching a deduplication index table stored on the target storage system for an entry that matches the virtual index key stored on the source storage system, wherein deduplicated data at a logical address on the target storage system of the storage system is replaced with the pointer stored at the logical address on the source storage system.

2. The method of claim 1, further comprising:
   upon determining that the deduplication index table does not include the virtual index key, augmenting the deduplication index table to include the virtual index key and the next logical address on the target system to be processed in the asynchronous replication.

3. The method of claim 2, further comprising:
   sending, to the target system, data to store in association with the next logical address to be processed in the asynchronous replication.

4. The method of claim 1, further comprising:
   upon determining that the deduplication index table includes the virtual index key, (1) retrieving the logical address in the deduplication index table corresponding to the virtual index key, and (2) instructing the target system to perform a metadata copy from the retrieved logical address to the next logical address on the target system to be processed in the asynchronous replication.

5. The method of claim 1, wherein retrieving the virtual index key comprises:
   retrieving a virtual address referenced by the pointer, the virtual address associated with an entry in the virtual index.

6. A system for reducing bandwidth consumed during asynchronous replication of deduplicated data in a storage system, the system comprising a processor configured to:
   identify unique data on a source storage system of the storage system during a deduplication process using a virtual index stored on the source storage system, wherein the virtual index stored on the source storage system comprises a virtual index key;
   retrieve, on the source storage system, a first virtual index key corresponding to a pointer stored at a logical address on the source storage system;
   determine whether data associated with the logical address on the source storage system has been transferred to a target storage system by searching a deduplication index table stored on the target storage system for an entry that matches the virtual index key stored on the source storage system, wherein deduplicated data at a logical address on the target storage system of the storage system is replaced with the pointer stored at the logical address on the source storage system.

7. The system of claim 6, wherein the processor is further configured to:
   upon determining that the deduplication index table does not include the virtual index key, augment the deduplication index table to include the virtual index key and the next logical address on the target system to be processed in the asynchronous replication.

8. The system of claim 7, wherein the processor is further configured to:
   send, to the target system, data to store in association with the next logical address to be processed in the asynchronous replication.

9. The system of claim 6, wherein the processor is further configured to:
   upon determining that the deduplication index table includes the virtual index key, (1) retrieve the logical address in the deduplication index table corresponding to the virtual index key, and (2) instruct the target system to perform a metadata copy from the retrieved logical address to the next logical address on the target system to be processed in the asynchronous replication.

10. The system of claim 6, wherein the processor is further configured to:
    retrieve a virtual address referenced by the pointer, the virtual address associated with an entry in the virtual index.

11. The method of claim 1, further comprising:
    traversing, on the source system, a set of logical addresses corresponding to deduplicated data to replicate to the target system, the set of logical addresses including data and pointers associated with deduplicated data.

12. The method of claim 1, wherein the virtual address is associated with a pointer to a physical address of unique data stored on the source system.

13. The method of claim 4, wherein the logical address in the deduplication index table corresponding to the virtual index key is a logical address on the target system where unique data has been stored.

14. The system of claim 6, wherein the processor is further configured to:
    traverse a set of logical addresses corresponding to deduplicated data to replicate to the target system, the set of logical addresses including data and pointers associated with deduplicated data.

15. The system of claim 6, wherein the virtual address is associated with a pointer to a physical address of unique data stored on the source system.

16. The system of claim 6, wherein the logical address in the deduplication index table corresponding to the virtual index key is a logical address on the target system where unique data has been stored.

17. A non-transitory computer readable media storing instructions executable by one or more processors to perform operations comprising:
    identifying unique data on a source storage system of the storage system during a deduplication process using a virtual index stored on the source storage system, wherein the virtual index stored on the source storage system comprises a virtual index key;
    retrieving, on the source storage system, a first virtual index key corresponding to a pointer stored at a logical address on the source storage system;
    determining whether data associated with the logical address on the source storage system has been transferred to a target storage system by searching a deduplication index table stored on the target storage system for an entry that matches the virtual index key stored on the source storage system, wherein deduplicated data at a logical address on the target storage system of the storage system is replaced with the pointer stored at the logical address on the source storage system.

18. The non-transitory computer readable media of claim 17, further comprising instructions executable to perform:
upon determining that the deduplication index table does not include the virtual index key, augmenting the deduplication index table to include the virtual index key and the next logical address on the target system to be processed in the asynchronous replication.

19. The non-transitory computer readable media of claim 18, further comprising instructions executable to perform:
sending, to the target system, data to store in association with the next logical address to be processed in the asynchronous replication.

20. The non-transitory computer readable media of claim 17, further comprising instructions executable to perform:
upon determining that the deduplication index table includes the virtual index key, (1) retrieving the logical address in the deduplication index table corresponding to the virtual index key, and (2) instructing the target system to perform a metadata copy from the retrieved logical address to the next logical address on the target system to be processed in the asynchronous replication.

* * * * *